United States Patent
D'Angelo

(10) Patent No.: US 6,717,938 B1
(45) Date of Patent: Apr. 6, 2004

(54) SYSTEM CONTROLLING USE OF A COMMUNICATION CHANNEL

(75) Inventor: Leo A. D'Angelo, San Francisco, CA (US)

(73) Assignee: j2 Global Communications, Inc., Hollywood, CA (US)

( * ) Notice: Subject to any disclaimer, the term of this patent is extended or adjusted under 35 U.S.C. 154(b) by 0 days.

(21) Appl. No.: 09/293,496

(22) Filed: Apr. 15, 1999

(51) Int. Cl.$^7$ ............................................... H04L 12/28
(52) U.S. Cl. ..................... 370/352; 370/401; 370/352; 379/88.13
(58) Field of Search ................................. 370/352, 353, 370/354, 355, 356, 410, 401; 379/88.13

(56) References Cited

U.S. PATENT DOCUMENTS

| | | | |
|---|---|---|---|
| 5,491,800 A | 2/1996 | Goldsmith et al. | 395/200.12 |
| 5,557,798 A | 9/1996 | Skeen et al. | |
| 5,706,434 A | 1/1998 | Kremen et al. | 395/200.09 |
| 5,818,836 A | 10/1998 | DuVal | |
| 6,072,780 A | 6/2000 | Johnson, Jr. et al. | |
| 6,175,619 B1 | 1/2001 | DeSimone | |
| 6,266,328 B1 | 7/2001 | Johnson, Jr. et al. | |
| 6,370,142 B1 * | 4/2002 | Pitcher et al. | 370/390 |
| 6,411,685 B1 * | 6/2002 | O'Neal | 379/88.14 |

FOREIGN PATENT DOCUMENTS

EP            0 609 016 A1      3/1994           H04M/3/00

OTHER PUBLICATIONS

*TIBCO Messaging Solutions*, TIBCO Data Sheet p. 1–2, TIBCO Software, Inc., Palo Alto, California Oct., 2002.
"Using Networks" from Frank Derfler, ISBN 0-7897-1596-1, edited in 1998 by Que, pp. 312-313.
IETF-RFC 1459 ("Internet Relay Chat Protocol"), May 1993, pp. 4-6 and 20, available at http://www.ietf.org/rfc/rfc1459.txt.

* cited by examiner

*Primary Examiner*—Douglas Olms
*Assistant Examiner*—Robert W. Wilson
(74) *Attorney, Agent, or Firm*—Blakely, Sokoloff, Taylor & Zafman LLP

(57) ABSTRACT

A system controlling use of a communication channel in a communication network. The system comprising a network including service nodes. The service nodes comprising one or more sets having one or more nodes adapted to provide service functions in response to messages in the network. At least one of the sets comprising a member node having an interface for communication with a remote terminal, and a user interface process coupled with the interface to include a user of the remote terminal in the network. At least one of the sets comprising a member node having an interface to the communication network, and a process coupled to the interface to control establishment of the communication channel for the user.

6 Claims, 7 Drawing Sheets

SYSTEM CONTROLLING USE OF A COMMUNICATION CHANNEL

BACKGROUND OF THE INVENTION

1. Field of the Invention

This invention relates to the field of communications networks. In particular, the invention relates to a system for controlling the use of a communication channel in a communication network.

2. Description of the Related Art

Communications systems are comprised of several distinct networks. The public switched telephone network (PSTN) is one example. Others include the facsimile network. Although facsimile machines typically transmit facsimiles using the PSTN, facsimile machines do not interoperate with the voice content of the PSTN. In that sense, facsimile machines form a distinct network of communications devices that are not easily linked with the PSTN. Similarly, pagers form a network of devices. Other networks include data transmission networks such as the Internet and private networks. Also, voice over IP is becoming more common and that forms another network.

Each network operates on a different set of protocols and it is difficult for a user of one network to communicate with a user on another network using the network of their choice. It can also be difficult for individual users of a single network to communicate with multiple people on the same network simultaneously.

Accordingly, what is needed is a system for allowing users of different communications networks to communicate with one or more users through a single interface that will control the communications channels used.

SUMMARY OF THE INVENTION

A system for controlling the use of communication channel in a communication network is described. The system includes a network such as an Ethernet, a private Intranet, a subnetwork of the public Internet, or some other type of network. The network has service nodes that are grouped into multiple sets. Each set may have one or more service nodes of the same type. For example, one set of service nodes might provide billing functions. There might be four service nodes in the billing function set.

One of the sets has a member node with an interface for communicating with a remote terminal. The interface is coupled to a user interface process to include a user of a remote terminal in the network. The user interface process may be the Rendezvous™ Routing Daemon or some other interface that allows the user at the remote terminal to contact the network and send messages to the service nodes. One of the sets has a member node with an interface to the communication network. This might be a switch controller. The switch controller has a process coupled to the interface that controls the establishment of a communication channel for the user.

The system may include logic to receive requests to contact one or more people from the remote terminal, forward messages into the network, respond to requests and forward messages in the network concerning the requests to the remote terminal. For example, a user might request a conference call between herself/himself and three other people. A message would be sent from the remote terminal to the user interface process and then be forwarded into the network. Messages concerning the status, routing, and other aspect of the conference call are forwarded from the network to the remote terminal.

In one embodiment, each request is assigned a unique transaction identifier. In one embodiment once a transaction identifier has been assigned, it is included with all messages concerning that transaction in the network.

In one embodiment, each of the sets of service nodes is part of a distributed queue. The distributed queue enables the requests for service functions to be distributed amongst all of the service nodes performing like functions.

In one embodiment, the service nodes use the multicast protocol to send messages to one another. In another embodiment, the user datagram protocol is used to send messages. In another embodiment, the transmission control protocol over Internet Protocol (IP) is used to send messages.

In one embodiment, the service nodes of the system are located in a private subnetwork.

The communication network may be the public switched telephone network, a voice over IP network, or some other type of communication network.

The communication channel may comprise a voice channel, a data channel, a voice conference channel, or some other type of channel in the communication network.

One of the service functions may be to act as a service manager. The service manager acts as an intermediary between messages from the remote terminal and the rest of the system. The service manager receives user requests for communication channels, requests validation of the account information in the requests, and forwards the requests to a switch controller in response to the validation.

One of the service functions is a billing function. The billing function receives requests for the use of communication channels, validates account information in the requests and stores information about the use of communication channels. The billing function may also charge credit cards for the use of communication channels and communication services.

Another service function is a logging function. The logging function includes the ability to monitor the messages in the network and to store messages matching predefined criteria. The logger function also includes the ability to retrieve stored messages and generate a representation of the status of the system.

One of the service functions is a notifier. The notifier responds to messages matching predefined criteria with a specified action. The notifier may respond to error conditions by contacting an operator of the system using the communication network. The notifier may also store user request for use of communication channels and until a specified time and then forward the request into the network at the specified time.

Another service function is the switch controller. The switch controller receives requests for use of communication channels and forwards the requests into the communication network. The switch controller receives status information about the communication channels and the communication network. The switch controller forwards status information to the remote terminal. The switch controller also monitors the remaining credit available for the user and requests additional credit when the available credit falls below a predetermined amount. The switch controller can terminate the use of a communication channel when the available credit reaches zero.

In some embodiments, the system is embodied on a computer program product on a computer usable medium such as CD-ROM or floppy diskette. The computer usable medium has computer readable program code for causing a computer to control communication session. The computer program has instructions that receive requests from a user to communicate with a person. The program has instructions for composing a message to a communication server, such as the above system, requesting communication session. The program has instructions for monitoring the status of the communication session and for controlling the communication session.

The computer program has instructions for identifying the current location of the user and the current phone number at that location for the user. The program also has instructions for identifying the user account information and for requesting a phone number or determining a phone number for the person being called.

The computer program includes instructions for generating a message including a phone number for the user and a phone number for each person being contacted together with the account number for the user. The computer program includes instructions for sending a message over the network to the communication server.

The computer program has instructions for inserting a time for the communication session into the message and communicating that to the communication server. This can be used to setup a conference call at a designated time.

The computer program includes instructions to receive status messages from the communication server. The status messages can indicate the on-hook, off-hook, and ringing status of all of the parties to the call. The computer program can update the computer display to reflect the status of the parties to the communication session. In one embodiment, icons are used to show a ringing phone, a phone off-hook and a phone on-hook response to the status of each phone.

The computer program includes instructions for adding people to the communication session, removing people from the communication session, muting a participant's ability to speak, and placing a caller on hold during the communication session. The computer program also includes instructions for indicating that the communication session should end.

When multiple participants to the communication session are using the communication server, the computer program supports messaging over a data network to other users of the communication server.

The computer program includes instructions for locating a person and requesting status information from the communication server about the person. The status information might indicate the current phone number of the person and whether or not the person is on the phone.

The computer program includes instructions for requesting billing information about services used.

One embodiment supports anonymous communication between two people over the public switched telephone network. The method begins with the provision of each person's phone number to a computer rather than to each other. The computer then calls the first person and the second person on a conference channel in the public switched telephone network. The two parties are able to communicate without giving away their phone numbers. In one embodiment a link is included on a web page to allow someone viewing a web page to communicate anonymously with another party. In another embodiment, a link is included in a chat room to allow two participants of the chat room to have an anonymous conversation.

One embodiment a computer library provides a set of message definitions and service function interfaces. The message definitions include account message definitions, member message definitions, and call message definitions. The service function interfaces include interfaces for a service manager, a billing manager, a notifier, a logger and a switch controller. The interfaces describe the program calls that the service functions must implement.

DETAILED DESCRIPTION

A. System Overview

Figure 1:
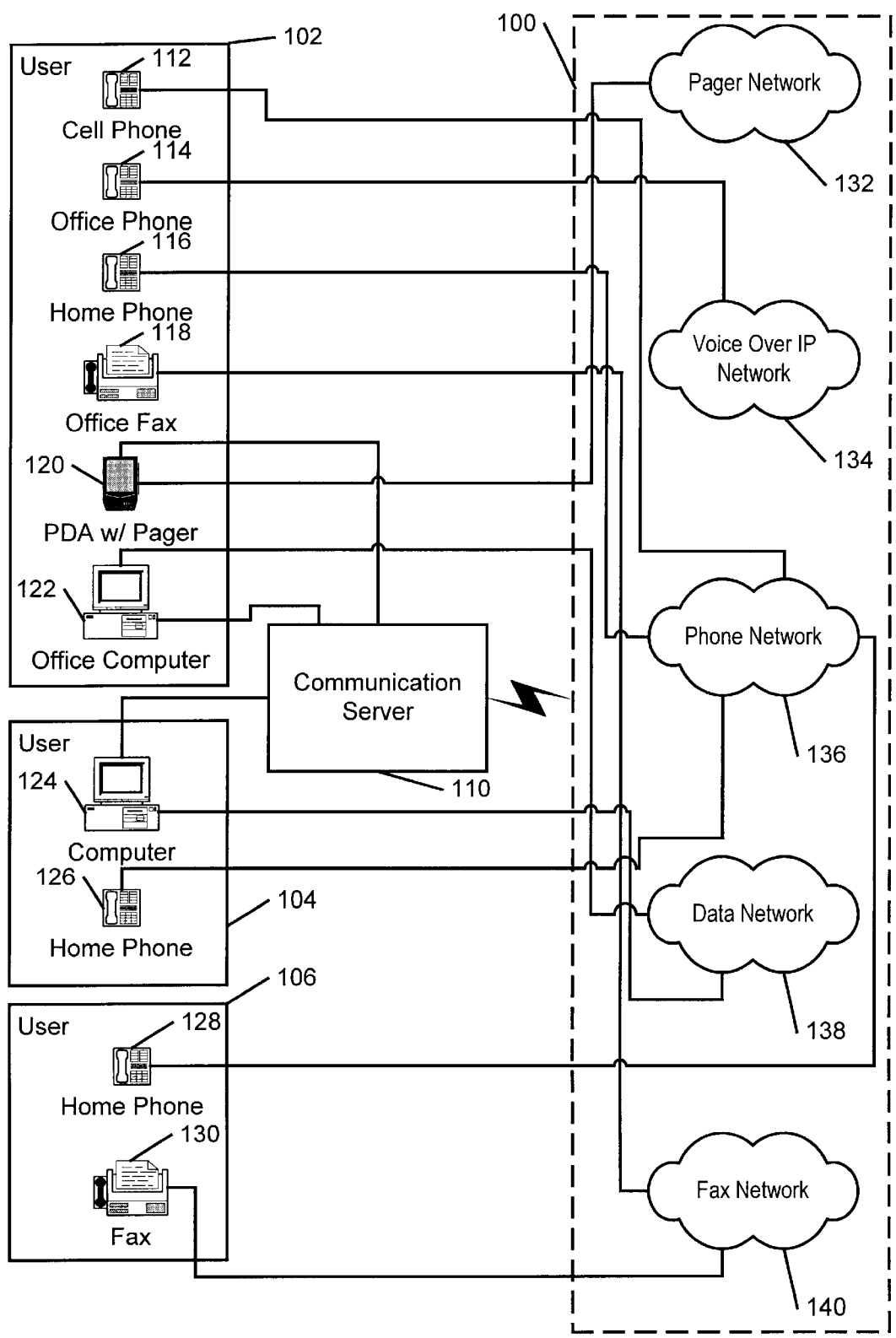
FIG. 1 is a block diagram showing a communication commerce server.

FIG. 1 is a block diagram showing a communication commerce server. A communication commerce server can be used to This paragraph lists the elements of FIG. 1. FIG. 1 includes a set of communication networks 100, a user 102, a user 104, a user 106, and a communication server 110. The set of communication networks 100 comprises a pager network 132, a voice over Internet Protocol (IP) network 134, a phone network 136, a data network 138, and a facsimile network 140. The user 102 has a cell phone 112, an office phone 114, a home phone 116, an office facsimile machine 118, a personal digital assistant (PDA) 120, and an office computer 122. The user 104 has a computer 124 and a home phone 126. The user 106 has a home phone 128 and a facsimile machine 130.

This paragraph describes the interconnections between the elements of FIG. 1. The cell phone 112, the home phone 116, the home phone 126, and the home phone 128 are coupled in communication with the phone network 136. The office phone 114 is coupled in communication with the voice over IP network 134. The office facsimile machine 118 and the facsimile machine 130 are coupled in communication with the fax network 140. The PDA 120 is coupled in communication with the pager network 132. The office computer 122 and the computer 124 are coupled in communication with the data network 138. The PDA 120, the office computer 122 and the computer 124 are coupled in communication with the communication server 110. The communication server 110 is coupled in communication with each of the networks in the set of communication networks 100.

Each of the elements of FIG. 1 will now be described. The set of communications networks 100 is a collection of different communication networks. In one embodiment, the set of communications networks includes the phone network 136 and the voice over IP network 134. The phone network 136, sometimes referred to as the public switched telephone network (PSTN), addresses each station according to a numbering plan. In North America, the North American Numbering Plan (NANP) is used and each phone line has a ten-digit phone number in the form of a three-digit area code followed by a seven-digit number. Numbers are assigned to phone lines, not individuals. Consequently, a single person may have multiple phone numbers. In contrast, the IP network uses an IP address where under the IPv4 standard, each address is four bytes. The IP address is linked to a specific station, not with a user, so a single person may have multiple IP addresses. Therefore, users of the phone network 136 can contact each other by using the ten-digit number and users of the voice over IP network 134 can contact each other by using the IP address. However, users solely on the two different networks cannot contact each other without some additional bridge.

The facsimile network 140 has typically been thought of as a subset of the phone network 136. This is because most facsimile machines communicate over the PSTN. However, facsimiles may be sent over data networks such as the Internet or the data network 138. Similarly, facsimile machines can operate over networks such as the voice over IP network 134. Typically, facsimile stations are addressed according to the NANP. The facsimile network 140 is distinct from the phone network 138 because a user solely on the two different networks cannot contact the other without some additional bridge. For example, a user with solely a traditional phone cannot send a facsimile to a facsimile machine without some additional bridge. Additionally, a facsimile machine coupled to the data network 138 may not be able to communicate with a facsimile machine coupled to the phone network 136.

The pager network 132 is typically addressed according to the NANP. However, many pagers can also be addressed over data networks such as the Internet or the data network 138. Although pagers can be contacted by users of the phone network 136, that is solely because the paging companies install specialized bridging software that receives the telephone call and decodes the dual tone multi-frequency (DTMF) signals to send a message to the pager over the paging network.

The data network 138 is a data network such as the Internet, a Local Area Network (LAN), a Wide Area Network (WAN), or some other type of data network. The data network may operate over other networks such as the phone network 136. Data networks are typically not designed for voice communication. However, protocols such as voice over IP do allow voice communication over the data network 138. Users of the data network 138 cannot communicate by voice with users of the phone network 136 without some additional bridge.

The communication server 110 serves to bridge the different networks in the set of communications networks 100. The communication server 110 also provides a uniform mechanism for allowing users to contact other people. The communication server 110 also provides a unified billing mechanism for the multitude of communication services used by a user.

The user 102, the user 104, and the user 106 are individuals. The user 102 and the user 104 are users of the communication server 110. The user 106 is an individual who does not use the communication server 110. The users 102–106 have a number of different contact points and mechanisms as shown by FIG. 1. For example, the user 102 has six different ways she/he can be contacted: the cell phone 112, the office phone 114, the home phone 116, the office facsimile machine 118, the PDA 120, and the office computer 122.

When the user 106, who is not a subscriber to the communication server 110, wants to contact the user 102, the user 106 must perform a number of steps. The user 106 must select a communication network. The user 106 must find the address for the user 102 in that communication network and the user 106 must provide the address for the user 102 in that communication network to their communication device. If the user 106 is not sure whether the user 102 is at her/his home or office, the user 106 may not know which phone number to dial to contact the user.

In contrast, the communication server 110 facilitates easier communication between the user 102 and her/his contacts. The user 102 accesses the communication server 110 and identifies her/his present location. Then, the user 102 identifies a person to contact, the person need not be a subscriber to the communication server 110. The communication server 110 then controls the communications channels between the user 102 and the other person or persons.

The communication server 110 may be composed of a variety of service nodes. The service nodes the service nodes may each run a variety of programs to provide service functions. It is also possible for a single service node to provide multiple service functions. The service nodes may be located in a single location or distributed in different locations. Typically the service nodes that provide control over telecommunications network equipment will be located in proximity to the network equipment. Consequently, the service nodes may be distributed in multiple locations and connected by a private network.

The term communication server can refer to all of the service nodes and service functions, but is also used to refer to a subset of the service nodes and service functions that includes all of the service nodes other than the switch controller nodes and switch controller functions. This terminology is used because a carrier can set up multiple switch groups based on capacity and demand in various locations (see FIG. 3).

B. Placing Calls

Figure 2:
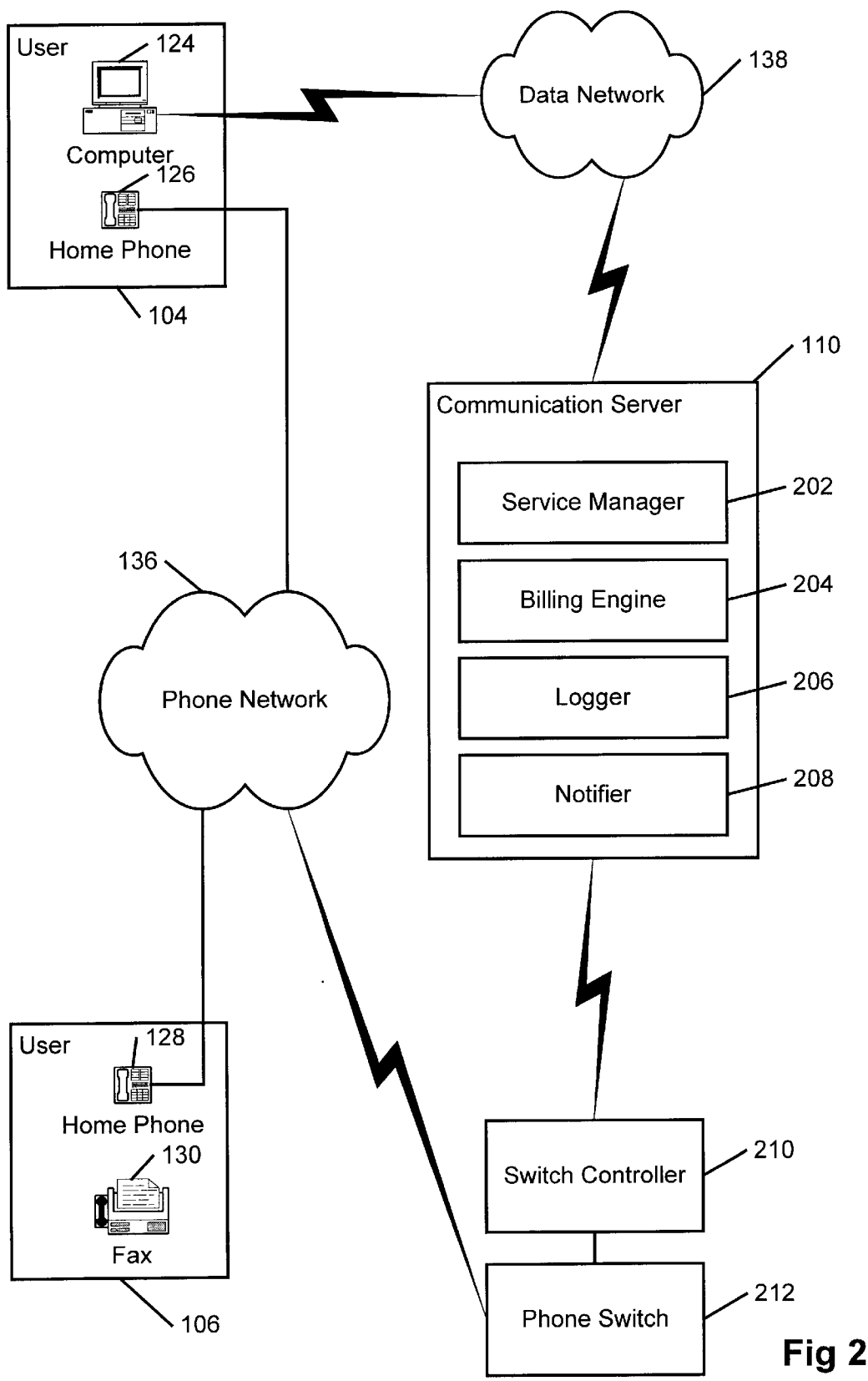
FIG. 2 is a block diagram showing how one embodiment of the communication commerce server can control communications channels between a subscriber and a non-subscriber

FIG. 2 is a block diagram showing how one embodiment of the invention can control a communications channel between a subscriber and a non-subscriber. FIG. 2 also demonstrates how the communication server 110 serves as a bridge between different communications networks and how the communication server 110 selects and controls a communication channel.

This paragraph lists the elements of FIG. 2. FIG. 2 includes the user 104, the user 106, the communication server 110, the phone network 136, the data network 138, a switch controller 210, and a phone switch 212. The communication server 110 is comprised of a service manager 202, a billing engine 204, a logger 206, and a notifier 208.

This paragraph describes the interconnections between the elements of FIG. 2. The computer 124 is coupled in communication with the data network 138. The data network 138 is coupled in communication with the communication server 110. The communication server 110 is coupled in communication with the switch controller 210. The switch controller 210 is coupled in communication with the phone switch 212. The phone switch 212 is coupled in communication with the phone network 136. The phone network 136 is coupled in communication with the home phone 126 and the home phone 128.

Each element of FIG. 2 will now be described. The user 104 connects to the communication server 110 over the data network 138 using the computer 124. The computer 124 can run a program for communicating with the communication server 110 or the communication server 110 can be contacted using a web browser program over the World Wide Web (WWW). Once the user 104 identifies herself/himself and her/his location to the communication server 110, the user 104 can contact individuals using the interface with the communication server 110. The user 104 can signal that she/he wants to contact the user 106 by selecting the user 106 from a list or by some other means. If the user 106 has multiple contact locations and is not a subscriber to the communication server 110, then the user 104 will be prompted to select a contact location. However, if the user 104 wanted to contact the user 102, a subscriber to the communication server 110, the communication server 110 can determine the correct contact location for user 102 without additional prompting because the user 102 would also have identified her/his location to the communication server 110 when she/he identified herself/himself to the communication server most recently.

Once the contact number has been selected, here the home phone 128 for the user 106, the client program on the computer 124 sends a message over the data network 138 to the communication server to initiate a call. The message may be encrypted. The communication server 110 receives the message in the service manager 202.

The service manager 202 may perform some basic checks and verification on the message and then sends the message to the billing engine 204. The billing engine 204 validates the request. The validation process includes checking the account of the requesting user and authorizing the call. The validation process can also include charging the credit card associated with the account of the user 104. The billing engine 204 sends a message to the service manager 202 to initiate the call once the account information has been validated. Upon receiving the validation from the billing engine, the service manager 202 will instruct the switch controller 210 to initiate the call.

The switch controller 210 is able to control the phone switch 212. The phone switch 212 then calls both the initiating party, here the user 104, and the receiving party, here the user 106. As the phone switch 212 calls the parties, messages are sent back through the switch controller 210 to the client program on the computer 124 to display the ringing and call status of the phone lines of the participants to the call. The display on the computer 124 can be updated to reflect the ringing and on-off hook status of the phone lines for each participant in response to the messages from the switch controller 210.

Throughout the call, the switch controller 210 will monitor the remaining credit on the account. If more credit is needed, the credit card associated with the account of the user 104 can be charged while the call is in progress. This is done by the switch controller 210 sending a message to the billing engine 204 to request more credit. The communication server 110 also supports conference calls where each party pays for her/his leg of the call.

The client program on the computer 124 allows the user 104 to add other parties to a phone call. The program also allows the user 104 to selectively limit the ability of individual participants to speak during the phone call. The program also allows the user 104 to selectively limit the ability of an individual participant to listen and speak during the phone call. For example, if the user 104 were to signal on the computer 124 that a third party, say the user 102 should be added, the user 104 could then control which of the other participants could speak and listen with the client program.

The communication server 110 also allows the client programs on the computers such as the computer 124 to send messages to other users that are coupled in communication with the communication server 110. During conference calls with other subscribers to the communication server 110 this provides a second channel of communication in addition to the voice channels and conference channels being used.

The communication server 110 and the client program on the computer 124 alleviate the need for the user 104 to decide how to route her/his call. Furthermore, the communication server 110 supports bridging a variety of technologies. For example, the phone switch 212 could be coupled to a voice over IP router and allow communication with the office phone 114 belonging to the user 102 which is coupled in communication with the voice over IP network 134. The user 104 only needs to indicate who she/he wants to contact, the communication server 110 handles the other details and provides a single, unified, bill for the communications services used.

The logger 206 serves to log the messages transmitted in the network and to store them. The logger 206 provides useful support for monitoring network status and maintaining network operations.

The notifier 208 serves to provide business rule specific responses to messages. For example, the notifier 208 can be programmed to listen for error messages in the network. The notifier 208 can then process the error messages through business rules provided by the operator of the communication server 110 and take appropriate actions. Actions might include paging the network supervisor, contacting multiple staff members by telephone, sending electronic mail messages, shutting down parts of the system such as a faulty switch, or some other actions.

The notifier 208 also supports scheduled conference call notifications. The user 104 can schedule a conference call for a specific time and the notifier 208 can trigger actions to the conference participants at the scheduled time.

C. Detailed View of Communication Server

Figure 3:
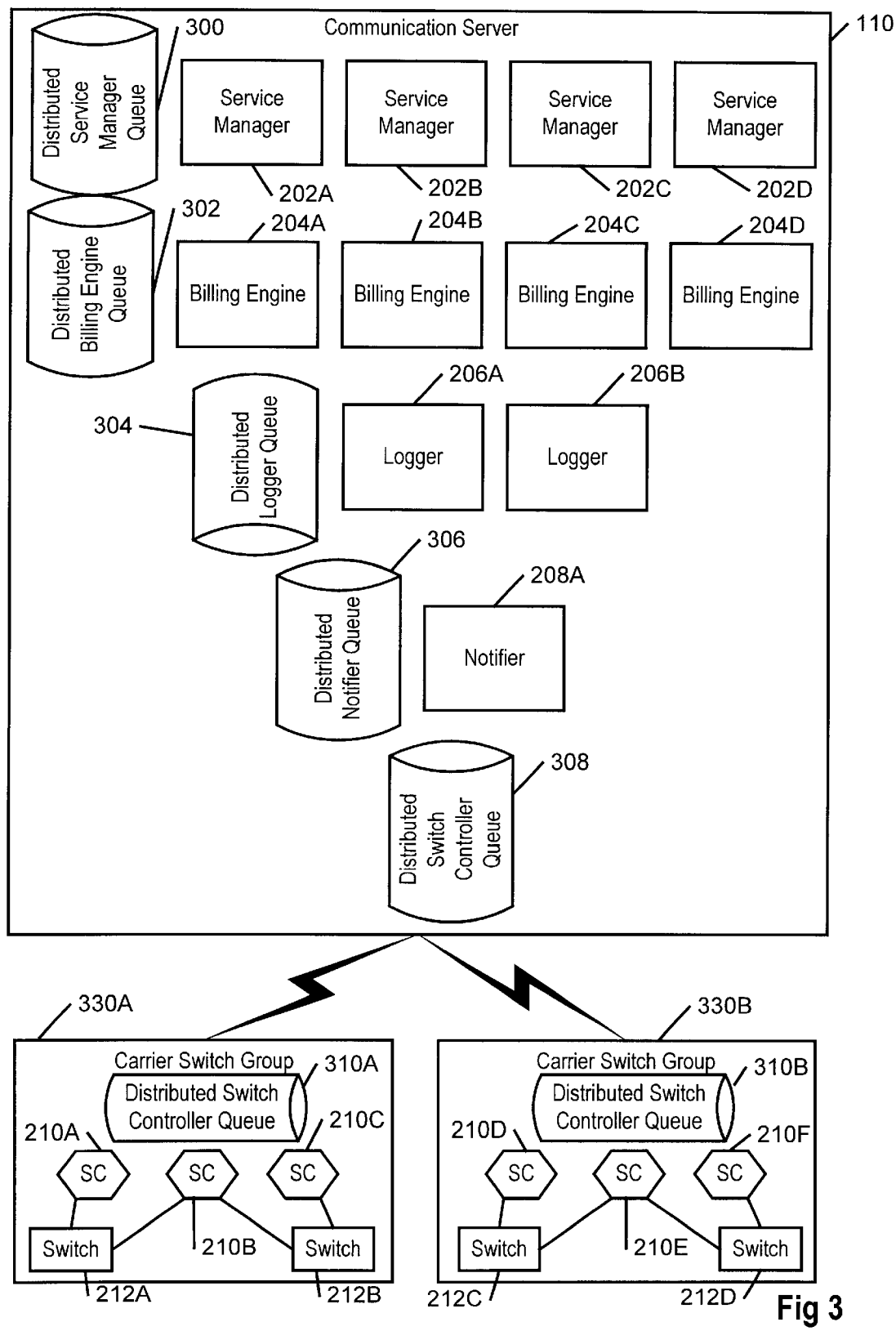
FIG. 3 is a block diagram of an embodiment of a communication commerce server.

FIG. 3 is a block diagram of an embodiment of a communication server together with multiple switch controllers. FIG. 3 demonstrates the scalable and distributed nature of the communication server.

The communication server 110 need not run on a single computer or even on a single subnetwork or network. In one embodiment, the components of the communication server 110 are modules that communicate using TIB®/Rendezvous™ messaging over an Internet protocol (IP) network. TIB®/Rendezvous™ is supplied by Tibco, Inc. of Palo Alto, Calif. The messages can be in user datagram protocol (UDP), multicast protocol, or transmission control protocol (TCP). The Rendezvous™ routing daemon enables the components to be distributed throughout different networks and handles protocol conversions as necessary to enable the components to communicate. The messaging architecture is disclosed in "Apparatus and Method for Providing Decoupling of Data Exchange Details for Providing High Performance Communication Between Software Processes," Marion D. Skeen, et. al., U.S. Pat. No. 5,557, 798, filed Dec. 21, 1990.

The components of the communication server 110 are each computer programs, applications, applets, or some other type of program that are coupled in communication with one another. They may be located on a single computer with multiple processors or on multiple computers in different physical locations. In one embodiment, the components of the communication server 110 are located on multiple computers in a single physical facility with two or more IP subnetworks coupled in communication. This configuration supports fault tolerance, redundancy, and load balancing.

In one embodiment, load balancing, fault tolerance, and redundancy are also supported by using a distributed queue architecture as supplied by the TIB®/Rendezvous™ system. For example, the communication server 110 might have four service managers 202A–D. Each service manager belongs to a single distributed queue, the distributed service manager queue 300. Similarly, there might be four billing engines 204A–D. Each billing engine belongs to a single distributed queue, the distributed billing engine queue 302. The communication server 110 might have fewer loggers. Here, only two loggers are supplied, the loggers 206A–B. Again, each logger belongs to a single distributed queue, the distributed logger queue 304.

The distributed queue architecture is extremely flexible. For example, the communication server 110 has only a single notifier currently operating, the notifier 208A. Nonetheless, it belongs to the distributed notifier queue 306. This permits more computer resources to be brought to bear as needed. If an additional notifier is needed, another notifier program can be run, a new computer added, a new network site brought on line, etc., and the distributed queue architecture will enable the load balancing between the multiple notifiers. In one embodiment, at least one of each service is running on each of the two IP subnetworks at the physical site of the communication server 110. This allows a failure of an IP subnetwork while allowing the communication server 110 to continue to function.

A distributed queue also can couple devices that are remotely located as shown by the distributed switch controller queue 308. In this example, there are two carrier switch groups 330A–B. The carrier switch group 330A might be in New York while the carrier switch group 330B might be in Los Angeles. The distributed switch controller queue 308 might be located in San Francisco along with the other components of the communication server 110.

Each carrier switch group has multiple switch controllers 210A–F and multiple phone switches 212A–D. There is no fixed number of switch controllers or phone switches that make up a carrier switch group. Each carrier switch group can have any number of resources based on the switching capacity needed for the carrier switch group. If a user has only purchased time with a single carrier, the billing engines 204A–D and the distributed switch controller queue 308 will ensure that calls are only placed over the carrier networks for which the user has privileges.

The switch controllers 210A–F may be running on UNIX workstations such as a Sun™ Sparcstation™ or a Windows™ NT workstation. Products such as Marathon Endurance® from Marathon Technologies of Boxborough, Mass., can be used to provide additional fault tolerance under Windows™ NT. Marathon Endurance® allows a multiprocessor workstation to have a processor failure and continue to function.

The distributed queues can schedule based on a number of operator defined criteria. The distributed service manager queue 300 primarily uses round robin scheduling based on current call load. The service managers 202A–D each have a capacity. The service managers 202A–C might have a capacity of 1000 while the service manager 202D might have a capacity of 2000. When the distributed service manager queue assigns a call request to a service manager, it assigns it to the service manager with the highest remaining capacity. Thus, the first 1000 calls will go to the service manager 202D until the load of all of the service managers is 1000. Each time a call is assigned to a service manager, the capacity is reduced by 1. Once the call is completed, the service manager will increase its capacity by 1. This ensures a relatively even distribution of call load among the service managers it also ensures that when a new service manager is brought on line, the load is quickly equalized.

The distributed billing engine queue 302 operates in a similar fashion. However, the distributed billing engine queue 302 also ensures that selected messages are received by each billing engine individually. This supports redundancy because the billing information is on all of the billing engines. The distributed logger queue 304 and the distributed notifier queue 306 perform in the same fashion as the billing engine queue.

The distributed switch controller queue implements a scheduling algorithm that allows switches to be easily allocated and also allows the deployment of new technology easily. A scheduling algorithm has been developed for the distributed switch controller queue 308 that allows load balancing. Each switch is assigned a weight and a capacity. The weight corresponds to the general reliability of the phone switch. For example, a new voice over IP phone switch might be assigned a weight of 250 and have a capacity for 1000 channels. The Summa™ 4 switch might be given a weight of 1000 and have a capacity for 4000 channels.

D. Detailed View of Phone Switch

Figure 4:
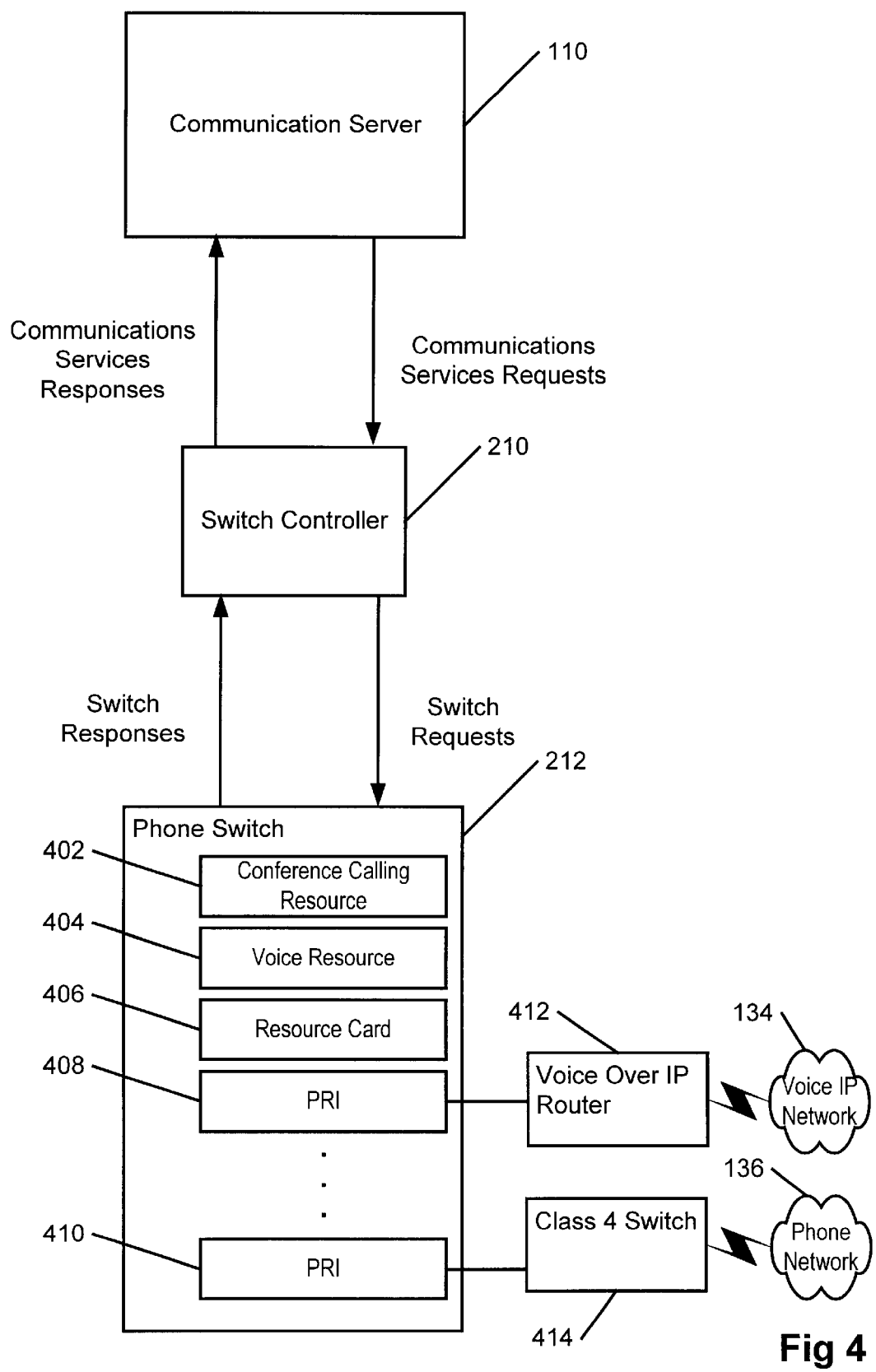
FIG. 4 is a block diagram of a phone switch.

FIG. 4 is a block diagram of a phone switch. FIG. 4 shows how the communication server 110 is able to communicate with the phone network 136 and other networks.

The communication server 110 is coupled in communication with the switch controller 210 which is in turn coupled in communication with the phone switch 212. The phone switch 212 includes conference calling resource 402, voice resource 404, resource card 406, primary rate interface (PRI) 408, and PRI 410. The PRI 408 is coupled to a voice over IP router 412 which is coupled in communication with the voice over IP network 134. The PRI 410 is coupled to a class 4 switch 414 which is coupled in communication with the phone network 136.

The phone switch 212 can be a programmable phone switch such as the Summa™ 4, a class 5 switch, or some other type of phone switch. The phone switch 212 is responsive to switch requests and provides switch responses to those requests. The switch controller 210 serves to translate communications services requests from the communication server 110 into switch requests for the phone switch 212. The switch controller 210 also translates the switch responses from the phone switch 212 into communication services responses for the communication server 110. The switch controller 210 has device specific control knowledge. If a new type of phone switch is being deployed, only the switch controller 210 needs additional programming.

The phone switch 212 is equipped to provide conference calling via the conference calling resource 402. The voice resource 404 enables the phone switch 212 to generate audio prompts. The audio prompts can be announcements like, "Extension Four-One-Three please," or some other spoken text. The audio prompts enable the phone switch 212 to complete calls to called persons who have a human operated switchboard. The voice resource 404 also can be used to generate prompts such as if credit is running low during a conference call, a message could be played indicating that the call will end in a designated time. The phone switch 212 is also capable of generating and decoding DTMF signals. This enables the phone switch 212 to complete calls to called persons who have a DTMF reachable extension. It can also be used to contact pagers over the pager network 132. Facsimile resources can be added to the phone switch 212 to support facsimile transmission. The resource card 406 is used by the phone switch 212 to track and monitor the available resources. The resource card 406 is used by the Summa™ 4 switch but may not be used by other phone switches.

The PRI's 408 and 410 supply the phone lines. Each PRI supports fifteen analog phone lines. Alternatively, other resources could be used to support phone lines. Depending on the need and the capacity, the phone switch 212 can have more PRI's, conference calling resources 402 and other resources. The PRI 410 handles plain old telephone service (POTS). A class 4 phone switch such as a Nortel DMS 250 or an AT&T 5ESS is used to carry the call from the PRI 410 onto the phone network 136. Alternative configurations are possible, and any programmable phone switch could be used. Or, if at some point, the phone network 136 is modified to allow class 5 switches to carry calls onto the phone network 136 directly, a Summa™ 4 could directly bring the call from the PRI 410 onto the phone network 136. The PRI 408 is coupled to a voice over IP router 412. The voice over IP router 412 enables the phone switch 212 to communicate with the voice over IP network 134.

E. Detailed Call Setup Flow

Figure 5A:
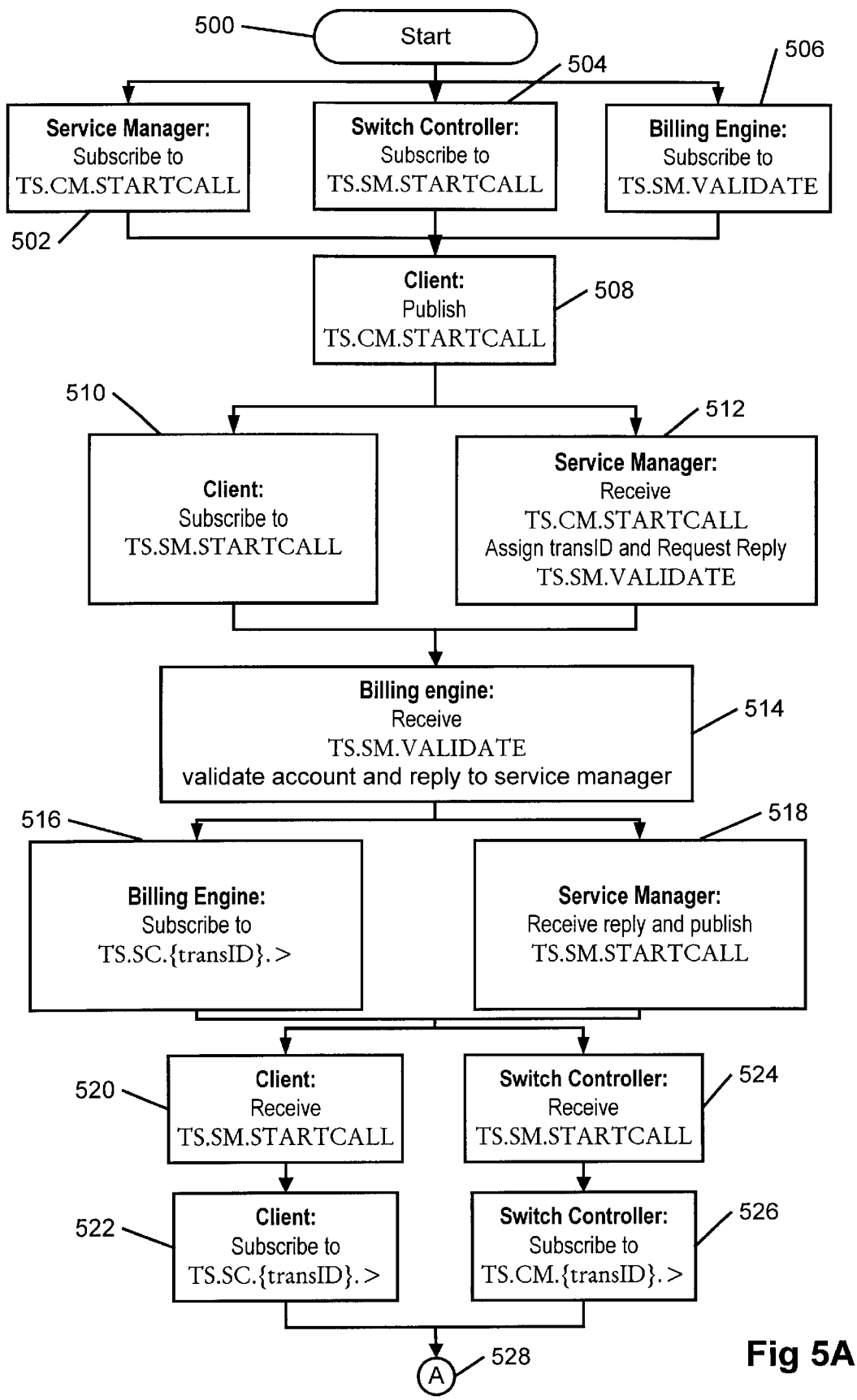
FIGS. 5A–B are process flow diagrams demonstrating a method for setting up a telephone call in one embodiment of the invention.
Figure 5B:
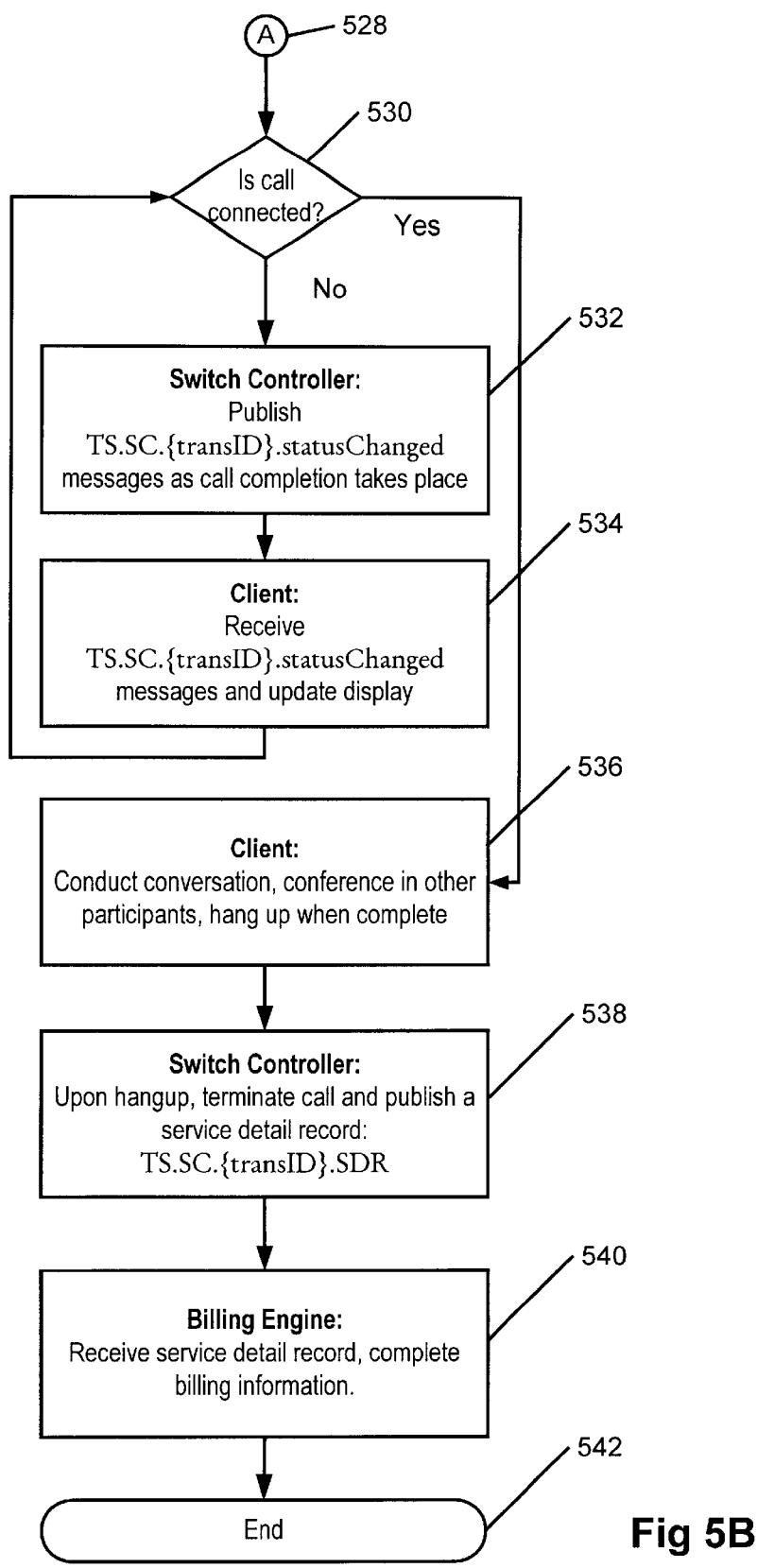

FIGS. 5A–B are process flow diagrams demonstrating a method for setting up a telephone call in one embodiment of the invention. FIGS. 5A–B show the flexible nature of the communication server 110.

1. Subject Based Messaging

In order to understand the process of FIGS. 5A–B, it is helpful to understand subject based messaging as used by the components of the communication server 110 in one embodiment of the invention. Although subject based messaging is one messaging technique that can be used in the invention, other messaging systems or other communications architectures may be used. The TIB®/Rendezvous™ messaging system offers publish/subscribe messaging and request/reply messaging.

Publish/subscribe messaging allows a single message to be published on a subject name a single time. Those components interested in a particular subject name subscribe to the subject name. The TIB®/Rendezvous™ software efficiently handles the reliable routing of the messages based on the subject name. Certified message delivery is also supported.

Request/reply messaging is demand driven. Typically it is used by a client to request an individual reply from a server. For example, the service manager can request a reply from the billing engine as to the validity of an account. Again the TIB®/Rendezvous™ software handles the routing of the messages based on subject name.

Subject names in the TIB® system are comprised of multiple components. A full subject is written out by placing a period between each component of the subject name. Thus, the message "TS.CM.STARTCALL" is a single subject name comprised of three components. The components become important because software modules using the TIB® system can subscribe to wildcard subject names. For example, the logger might subscribe to "TS.>" where the ">" wildcard operator matches if the subject name contains the literal component plus at least one additional subject name component. Messages that would be matched include "TS.CM.STARTCALL", "TS.SM.VALIDATE", "TS.{transID}.ERROR", etc.

In describing subject names, sometimes a subject name component is written surrounded by braces, e.g. {transID} in "TS.{transID}.ERROR". This convention is used to indicate that the subject name of the message has the current value of the identifier filled in, e.g. for the transaction identifier 945, the subject name would be "TS.945.ERROR".

2. Messages

The subject based addressing provides a mechanism for transmitting messages among components of the communication server. There are several common message types that are used by the communication server.

The messages used by the communication server can all depend off a single base class of messages for service messages. The service messages class is then further divided into subclasses for phone calls, facsimiles, pagers, and other services. The subclasses provide methods and instance variables for network specific functionality. The messages for phone calls will be considered here in detail.

a. Call Message

The call message is used to provide information about call set ups. A call message is comprised of a collection of call specific information together with a collection of member messages. The call message will have one member message for each leg of the conference call. The call message can include the following: a conference call name, a conference call password, a start time, an end time, a transaction identifier, a switch identifier, a login identifier, a time to start the call, and other fields. These fields are not all filled in at once. Throughout the description of the call process, the usage of the fields will be described.

b. Member Message

Member messages are used to provide information about the people to be contacted. Member messages are typically encapsulated with call messages but, are also sent on their own. In the case of a call message, each leg has a leg identifier, or legID, the legID 0 is the call originator who can control the call and who is typically billed for all legs of the call.

The member message includes contact information for contacting the person called. The message can include a name, a number, an extension, information about how the extension is reached, a status message, a leg identifier, an account message, different phone numbers and contact point information, the start and end time for the leg, and other fields. These fields are not all filled in at once. Throughout the description of the call process, the usage of the fields will be described.

c. Account Message

Account messages are used to provide account information and authorization. Account messages typically contain an account number, a password, the current amount of available credit, and other fields. The password may be encrypted. The message also has a field to indicate when the account has been verified. These fields are not all filled in at once. Throughout the description of the call process, the usage of the fields will be described.

3. Call Setup Phase

At step 500, the process starts. The process is shown in parallel, but the steps need not occur in parallel.

At step 502, the service manager subscribes to "TS.CM.STARTCALL". The service manager could be the service manager 202. This is the subject name that the client will use to request the start of a call. If there are multiple service managers, they belong to a distributed queue that will receive the message and then assign one of the service managers to handle the message.

At step 504, the switch controller subscribes to "TS.SM.STARTCALL". The switch controller could be the switch controller 210. The switch controller 210 is programmed to verify that the message published on "TS.SM.STARTCALL" comes from the service manager. This ensures that the client cannot bypass the billing system.

At step 506, the billing engine subscribes to "TS.SM.VALIDATE". The billing engine could be the billing engine 204.

Next, at step 508, the client publishes a message on the subject "TS.CM.STARTCALL". This is subject name used to start a phone call. The client could be using a WWW interface to the communication server 110 or could be using a program designed to communicate with the communication server 110. The message contents may be encrypted for transmission. The message published is a call message comprised of the call message fields and one member message for each participant including the call originator. The member message for the originator will include an account message. Initially, the client program will fill in a name for the conference, if desired, and a password for the conference, if desired. Neither of those fields is necessary. However, they do allow non-subscribers to join the conference via the conference name over the WWW by the conference call's name. There is a field in the call message that lists the number of current members in the call. That field provides information about how many member messages are part of the call message. A member message will have filled in the name of the person being called, or if it's the originator the name of the originator, then, the phone number where that person is currently and if necessary, their extension and the extension type at that location. The originator's member message will include an account message having user's ID and password filled in. Later, that account message will be validated by the billing engine and the credit available will be filled in.

Next, at step 510, the client subscribes to "TS.SM.STARTCALL."

At step 512, a service manager, via a distributed queue, is assigned to process the message published by the client in step 508 on the subject "TS.CM.STARTCALL". If the message was encrypted over the public Internet, the message is decrypted. The service manager can perform some preliminary checks on the message contents. Then, the service manager assigns a transaction identifier, or transID, to the call and uses request/reply messaging on the subject "TS.SM.VALIDATE" to have the account information validated by the billing engine. Each account message that is in any of the member messages of the call message, will be validated. The validation includes providing the amount of available credit and validating the account based on the account number and password provided by the client program.

Next, at step 514, a billing engine, via a distributed queue, is assigned to process the request by the service manager in step 512. The billing engine could be the billing engine 204. The billing engine is responsible for validating the account information and replying to the service manager. The billing engine can operate in a number of ways. For example, a custom accounting database can be used as can industry standard products such as Portal. Different billing engines can operate on different systems either permanently or during transitions between billing systems.

Next at step 516, once the account is verified, the billing engine subscribes to "TS.SC.{transID}.>". This allows the billing engine to listen to the published information from the switch controller about the call such as when the line was picked up, etc. These messages are used to bill the user for calls.

At step 518, the service manager receives the reply to the "TS.SM.VALIDATE" request and if there are no errors publishes to the subject name "TS.SM.STARTCALL". At this point the call message has been augmented with the account validation information from the billing engine. Additionally, the service manager has already provided a switch ID, the transaction ID and any other fields that the service manager needs.

Both the switch controller, via a distributed queue, and the client, are listening for the "TS.SM.STARTCALL" subject. At step 520, the client receives a message on the subject "TS.SM.STARTCALL" indicating that the call will be started by the switch, in response, control proceeds to step 522 where the client subscribes to messages from the switch controller concerning the call on the subject "TS.SC.{transID}.>". This subject is used by the switch controller to publish messages about the call status.

At step 524, the switch controller receives the message on the subject "TS.SM.STARTCALL" indicating that it should initiate the call, in response, control proceeds to step 526 where the switch controller subscribes to messages from the client concerning the call on the subject "TS.CM.{transID}.>". These subjects are used by the client program to publish messages to control the call. For example, messages on this subject could be used to add legs to the conference call, drop legs from the conference call, add new participants, make participants listen only and end the conference call.

Control then proceeds to step 528 where the call setup phase is complete and the call itself will take place.

4. Call Process Phase

At step 530, the switch controller has signaled the phone switch to begin the call and whether or not the call has been connected is checked. Control proceeds at step 532 where the switch controller publishes messages on the subject "TS.SC.{transID}.statusChanged" to indicate call progress. Messages published on that subject include ringing, off hook, and busy. When the original call message requests multiple participants, control proceeds in the loop of steps 530 through 534 until all of the participants are connected. However, once the first participant is connected, they can begin talking to the originator at step 536.

At step 534, the client which is subscribed to all of the switch controller messages on the transaction identifier receives the message on the subject "TS.SC.{transID}.statusChanged" and updates the client display appropriately. Control proceeds at step 530 until the call is connected or due to errors, the call cannot be connected.

Once the call is connected, control proceeds from step 530 to step 536. At this step, the user of the client is able to conduct her/his conversation. Because the billing engine has authorized the user for a certain amount of time, or money, with the switch controller, the client can directly communicate with the switch controller. The user can control the conference call through communication with the switch controller on the subjects: "TS.CM.{transID}.ADDLEG", "TS.CM.{transID}.DROPLEG", "TS.CM.{transID}.MUTE", "TS.CM.{transID}.LISTENONLY", and "TS.CM.{transID}.ENDCALL". The add leg and drop leg subjects are used to add and drop legs from the conference call respectively. The mute subject is used to mute a person from listening and speaking while muted. The listen only subject allows a person to listen only and does not allow them to speak while set to listen only. The end call message is used to signify the complete end of the call by the client. The switch controller handling the conference call receives these messages because it is subscribed to the subject "TS.CM.{transID}.>".

When the call is ended, control proceeds to step 538, the switch controller generates a service detail record and publishes it on the subject "TS.SC.{transID}.SDR". The service detail record contains the start and end times for each leg of the call along with any necessary billing information. The start and end times for each leg are filled into the member messages provided to the switch controller.

At step 540, the billing engine receives the service detail record because it subscribed to that subject at step 516. The billing engine enters the details of the legs into the billing database and the billing information can immediately be queried by the client. The client can always see the most current billing information including the most recent call and all of the conference legs and costs. In some embodiments, some details for a call underway are available as well.

F. User Interface View

Figure 6:
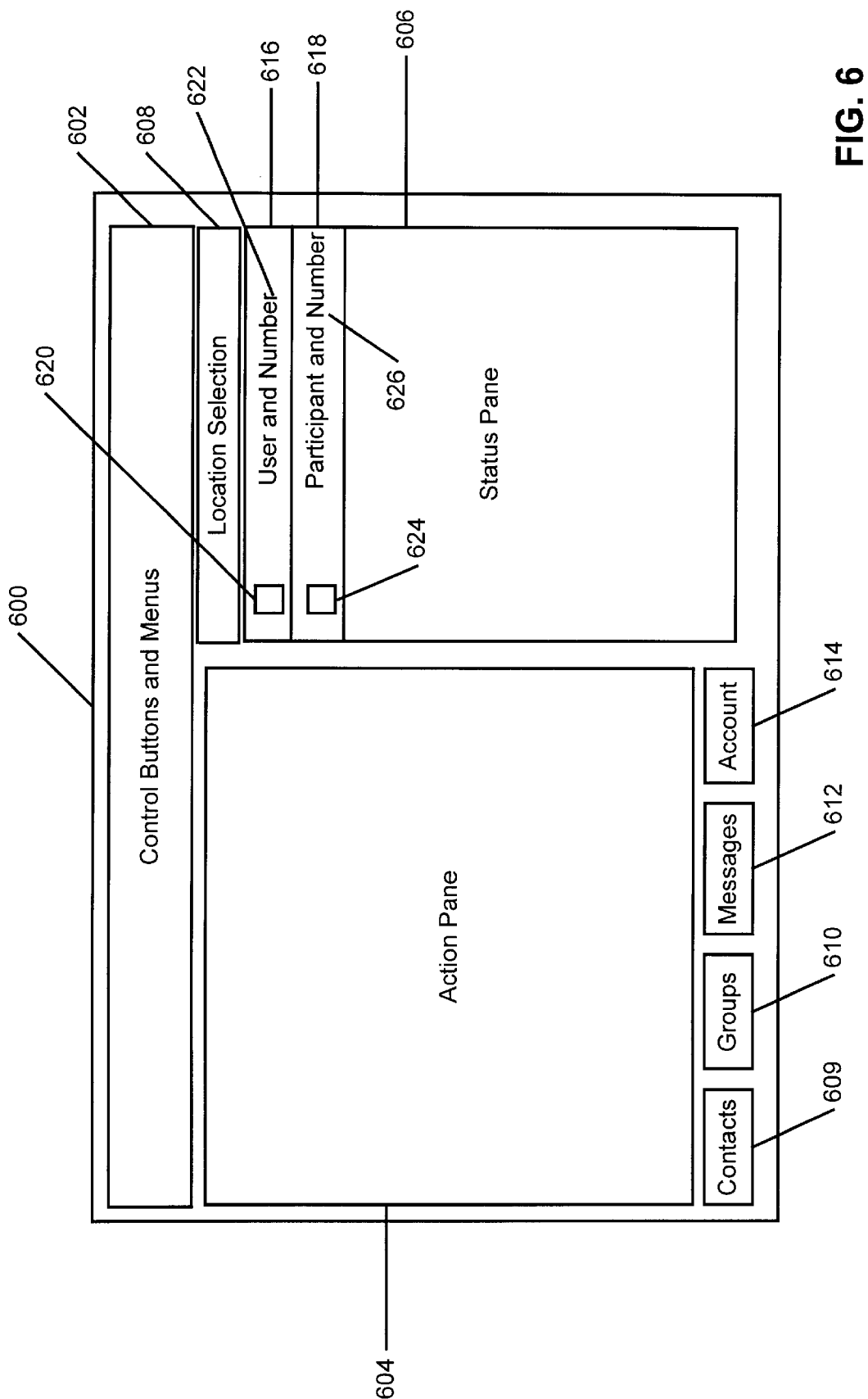
FIG. 6 is a block diagram of a user interface for controlling the communication server.

FIG. 6 is a block diagram of a user interface for controlling the communication server. The user interface could be used to control the communication server 110.

This paragraph lists the elements of FIG. 6. FIG. 6 includes a window 600. The window 600 includes a control buttons and menus pane 602, an action pane 604, a status pane 606, a location selection pane 608, a contacts button 609, a groups button 610, a messages button 612, an account button 614, a status display 616, and a status display 618. Status display 616 includes status indicator 620 and participant description 622. Status indicator 618 includes status indicator 624 and participant description 626.

Each of the elements of FIG. 6 will now be described. The user interface window 600 displays buttons, controls and panes for controlling the communication server. The panes can be arranged in a number of layouts and might be frames or table entries in a HTML document or panes in a window of a computer program.

The control buttons and menus pane 602 contains menus and control buttons for various operations. The buttons and menus can be context sensitive depending on the selection in the action pane 604, the selection in the status pane 606, the status of the network and the status of the conference call. The control buttons and menus pane 602 includes buttons for adding and dropping participants to a conference call, muting participants to a conference call, setting a conference call participant to listen only, and ending the conference call. The menus include options for configuring user preferences and the import of contact from various sources. For example, contacts can be imported from programs such as Microsoft's OutLood™, ACT™, Schedule Plus, and other personal information managers. The imported contact information is stored in a format usable by the client program. It can be stored on the client computer, on a WWW server or some other computer or server. The current list of contacts can be accessed by signaling on contacts button 609. Additionally, there are control buttons in the control buttons and menus pane 602 that allow contacts to be added and deleted from the client program's contacts list. Other features include the ability to synchronize the contacts list with a contact manager.

The location selection pane 608 displays the current location of the user and allows the user to indicate her/his present location. For example, the location selection pane 608 might indicate "Office". The communication server 110 is then aware that the user is in her/his office and of the phone number for the user at that location. If the user were to signal on location selection pane 608 and change her/his location to "Home", then the location selection pane 608 would indicate that the user is at home. When the user's location changes, the client sends messages to the communication server 110 to update the user's location. When other users of the communication server 110 want to contact the user, the location information can be used by the communication server 110 to enable them to contact the user without having to selecting the current phone number for the user.

The status pane 606 displays call progress information, there is one status display for the user, the status display 616 and one status display for each participant in the phone call. Additionally, the status pane 606 can be customized by the user to show the status of other users of the communication server 110. In this example, the status for a participant in the conference call is shown on the status display 618.

Each status display has a status indicator and the name and phone number of the person for which the status is being shown. In this example, the status indicator 620 indicates the status of the phone or other communication device for the user of the communication server 110 at their current location as selected from the location selection pane 608. The status indicator can be an icon or collection of icons based on the type of communications device. In one embodiment, their are icons for a phone on the hook, a phone ringing, a phone busy, and a phone off the hook. The participant description 622 lists the user's name and her or his phone number at the current location. Other information can be displayed depending on the situation. For example, the client program might have options to show the amount of time in the conference call next to the participant's name or other information relevant to the status display. The status indicator 624 indicates the phone status of the participant. The participant description 626 indicates the participant's name and phone number at the called location. During the call process, the status indicator 624 will change as the participant's phone rings and then is picked up or determined to be busy.

The action pane 604 displays different information depending on the selected view. The view can be changed using the four buttons at the bottom of the window 600. For example, when the contacts button 609 is selected, the action pane 604 displays a list of the current contacts. Under the Windows™ operating system each contact's name is listed with a "+" expand selector as used in Windows™ Explorer to enable the user to selectively expand and collapse the display of information associated with a contact. Each contact has an expandable entry in the action pane 604. When expanded, all of the different phone numbers, email addresses, pager numbers, facsimile numbers and other numbers for a user are expanded. When collapsed only the contract's name appears.

When the groups button 610 is selected user-defined groups of contacts are shown as one coherent entry. Again, expand selectors allow the user to selectively expand the list of contacts within a group. The contacts can then be further expanded to show individual contact information. For example, a user might create a group of contacts for the "Merger Working Group" The group might include contacts at both their user's company and the company with which they are planning to merge. A conference call could simply be made by selecting the "Merger Working Group" in the action pane 604 and signaling that a call should be placed. Additionally, the user can expand the "Merger Working Group" and select individual contacts from the group to contact or message.

When the messages button 612 is selected, the action pane 604 shows a message area for messages received and allows the user to send messages. Messages can be sent by selecting participants from the status pane 606 or from the contact list. The message can then be composed in a message entry pane. Once the message is composed, it can be sent by signaling on a button in the action pane or by some other signal. The messaging system allows a second channel of communication over the data network 138 during a conference call.

When the account button 614 is selected, the action pane 604 shows user-specific account information including the current bill, up to and including the most recent completed communications transaction.

During the conference call, the status displays 616–618 in the status pane 606 can be selected using standard selection techniques to allow multiple continuous and discontinuous status displays. When one or more of the status displays 616–618 are selected, actions from the control buttons and menus pane 602 can affect the selected participants. This allows selective muting, selective listen only, selective drop and selective messaging of participants.

G. Additional Functionality

1. Prearranged Conference Calls

The communication server allows a user to prearrange a conference call. The user can set a time for a conference call and have the communication server contact all of the participants. The system can contact subscribers to the communication server at the location they have told the system they are presently at. For the other participants to the conference call, the user setting up the conference call would provide the contact phone number.

2. Named Conference Calls

It is possible for a user to set up a conference call with a name and optionally a password for others to join. When setting up the call, who will pay the costs for each leg of the call can be controlled by the user. For example, a user could set up a call where each participant pays for her/his own leg of the call. Users would join the call by name in the client software or by entering the name and password of the conference call on a WWW interface to the communication server. The communication server will handle all of the billing for the calls in accordance with the rules set up by the user.

3. Messaging During Calls

While a call is taking place the client software and the WWW interface can support messaging over the data network 138. The text messaging can occur by selecting one or more people from a list and then typing a text message. Only the selected people receive the text message. This provides a second channel for communication during the phone call without the need for an additional phone call between the parties that want to have an additional private conversation during the conference call.

The messaging can also take place between any two commerce server users. Further, if a user is not logged on when a message is sent, the message will be held until the user logs in. Messages can also be sent to alphanumeric pagers.

4. Public-Private Network Environment

Because encryption incurs a relatively high computational cost, it is desirable to partition the environment into public and private network segments. Messages sent over the public Internet or other data network 138 such as the messages from the client programs to the communication server 110 or to other client programs can be encrypted, signed, or both. In particular the account information published under the "TS.CM.STARTCALL" subject can be encrypted to prevent unauthorized use of a user's account.

The components of the communication server 110 can be placed behind a firewall and isolated from the public Internet or other data network 138. Therefore, messages on this private network, or subnetwork, need not be encrypted or signed. Similarly, the communication server 110 and the switch controller 210 can be coupled in communication by a private network or a virtual private network. In one embodiment, a frame relay cloud is used to couple the communication server 110 and the switch controller 210. Therefore, the messages between the communication server 110 and the switch controller need not be encrypted or signed.

However, any or all of the messages may be encrypted, signed, or both, to enable the communication server 110 to operate in a more public network environment.

5. Facsimile Transmission

The communication server 110 supports other messages than the ones described above. For example, facsimile transmission can be handled using the subject name "TS.CM.STARTFAX". Other communication networks can be similarly added and removed. The subject based messaging offers the flexibility to use the same message contents and techniques for multiple purposes. In the case of facsimiles, the message can include the facsimile itself as part of the start message or as a separate message once the billing engine has validated the account.

6. Voice Interface

The invention supports an interface using the phone network 136 to control the communication server 110. The phone network interface allows a user such as the user 102 to contact the communication server 110 from her/his home phone number and use the communication server 110. The user dials into the communication server 110 and identifies herself/himself. The voice resource 404 provides voice prompts to the user 102 for entering their account number account information and password. The user can then have her/his electronic mail read to them if they have configured the communication server 110 with the appropriate information about their electronic mail accounts. This is supported by the voice resource 404 and the ability of the communication server 110 to access the data network 138. In addition, the communication server 110 can allow the phone network 136 to be used as an interface for setting up conference calls and all of the other features described above. This would allow a user to call into the communication server 110 from an airport or other location, other payphone location and the voice resource 404 can detect and receive signals to allow conference calls and the like to be set up and controlled.

7. Unified Billing

Unified billing by the communication server 110 is supported. The billing engine 204 can provide a single bill for all of the communication services that a user has used. For example, conference calls and regular telephone calls would be listed together with facsimile transmissions as well as paging transactions and other communication transactions. This is provides a single source for a user about their communications expenses. The bill is also updated in real time so that as each transaction is completed the bill is available for the user to review.

8. Operator Controlled Credit Card Charging

The communication server 110 supports charging a user's credit card incrementally for billing purposes. The operator of the communication server 110 identifies a charge amount, for example $100. This means that the communication server 110 will request credit in blocks of the charge amount from the user's credit card. While it is not necessary for accounts to be billed by credit card, this functionality is supported. The operator of the communication server 110 can choose to have their users pay each month or by some other arrangement.

When the billing engine 204 validates a start call request, the billing engine 204 will fill in the current amount credit available to the user. The available credit is based on what remains from the last block of credit charged to the user's credit card less the cost of any calls that were made. The credit available is provided to the switch controller 210 as part of the call message.

As the phone call takes place, the switch controller 210 decrements the available credit as it is used. When the remaining credit reaches a threshold set by the operator of the communication server 110, for example $10, the switch controller 210 sends a message to the billing engine 204 to charge another block of credit, here $100. If the billing engine 204 is unable to charge the user's credit card another block of credit, the switch controller 210 can use the voice resource 404 of the phone switch 212 to indicate to the conference call participants that the call will be ending and terminate the call when the available credit available is too low to support continuing the call.

If the billing engine 204 is able charge a block of credit, the switch controller 210 will add the block of credit to the credit remaining when it receives the message back from the billing engine 204. For example, if while the billing engine was processing the request for more credit, the remaining credit dropped to $9. When the additional $100 comes from the billing engine 204 then $109 would be available. This process continues as long as the call is in progress and additional credit is needed.

At the end of the call, the remaining credit is provided back to the billing engine 204 by the switch controller 210 for subsequent use.

9. LibTSMsg

LibTSMsg offers a simple way for other devices other servers and other clients to be defined for the communications server. LibTSMsg is a linkable program library such as a shared library or dynamic link library. All of the messages are prototyped in LibTSMsg. All of the components are prototyped in LibTSMsg. Specifically there is a core prototype for the various types of services. Additionally, for each of the different services, the service manager, the billing engine, the notifier, the logger, and the switch controller, there are derived classes built off the core prototype. Implementers of any of these services need only provide program code that responds to the defined class methods. This allows different versions of the software to coexist, even if different companies provide the software. For example, the default billing engine could be replaced with one designed to work with customized billing software.

Many of the functions in LibTSMsg rely on the TIB®/Rendezvous™ system. The system implements the message passing mechanism used in one embodiment of the communications server.

10. Integrated LDAP Server

The lightweight directory access protocol (LDAP) is an Internet protocol for directories. The communications server 110 supports integration with an LDAP server. The LDAP server can be used to look up member status, to locate contact numbers for members, and for other purposes.

The client program or the World Wide Web (WWW) interface allows a user of the communications server 110 to control what information is available on the LDAP server. For example, a user could allow none of their personal information to be published on the LDAP server. Alternatively, the user could allow their name to be looked up only by people with permission to do so. Another option is to allow anonymous contact only. This would allow people to contact them by entering their name and using the client program or the WWW interface only. This allows the user to be contacted without giving out their phone number.

11. Anonymous Phone Calls

The communications server can also be used to support anonymous phone calls. This can be used in chat rooms such as the Internet Relay Chat (IRC) or some other sort of chat room. It can also be used in a hypertext markup language (HTML) document served over the WWW. This allows a user of the chat server or a viewer of the WWW page to call another user without distributing their phone number. The operator of the chat service or WWW page provides a button or link on the screen that allows two or more users to call each other. Each user would provide their phone number over the chat service connection or the hypertext transfer protocol (HTTP) connection. The information might be encrypted during transit. The chat server or web server would then communicate the numbers to the communications server and a phone call would be initiated between the parties.

This is a useful feature in situations where two users do not want to distribute their numbers to each other but do want to communicate with each other.

12. Software

In some embodiments, the programs used in the commerce server 110, the service manager 202, the billing engine 204, the logger 206, the notifier 208, and the switch controller 210 are included in one or more computer usable media such as CD-ROMs, floppy disks, or other media.

Some embodiments of the invention are included in an electromagnetic wave form. The electromagnetic wave form comprises information such as the commerce server 110 programs, the service manager 202 programs, the billing engine 204 programs, the logger 206 programs, the notifier 208 programs, and the switch controller 210 programs. The electromagnetic waveform might include the programs accessed over a network.

H. Conclusion

The description of various embodiments of the invention has been presented for purposes of illustration and description. It is not intended to limit the invention to the precise forms disclosed. Many modifications and equivalent arrangements will be apparent. Therefore, persons of ordinary skill in this field are to understand that all such equivalent structures are to be included within the scope of the following claims and their legal equivalents.

What is claimed is:

1. A method for enabling a subscriber to a communication server to contact other people, comprising:
   receiving from the subscriber and via a data network an identification of another person;
   initiating and controlling, by the communication server, a communication channel through one of a plurality of distinct communication networks, for the subscriber to contact said another person, in a manner that alleviates the need for the user to decide how to route a call to said another person, the plurality of distinct communication networks include a public switched telephone network (PSTN), a facsimile network, a pager network, and a voice over internet protocol (VOIP) network;

identifying a current location of a first subscriber and a current phone number at that location for the first subscriber; and receiving an indication from the first subscriber that her location has changed to a new location, wherein the communication server can then enable a second subscriber to contact said first subscriber without said second subscriber having to select a current phone number of the first subscriber.

2. The method of claim 1 wherein the identification of the person to contact is received by the server via a network browser program over the Internet.

3. The method of claim 2 wherein the communication channel is an analog voice channel through the PSTN, and the channel is initiated by the server signaling a phone switch to call the subscriber and said another person using their respective telephone numbers.

4. The method of claim 1 wherein the communication channel is a VOIP channel through a VOIP network, and the channel is initiated by the server signaling a phone switch that is coupled to said VOIP network to connect the subscriber and said another person using their respective IP network addresses.

5. The method of claim 1 wherein the communication channel is through a pager network, and the channel is initiated by the server signaling a phone switch to contact a pager over a pager network.

6. The method of claim 1 wherein the communication channel is through a facsimile network, and the channel is initiated by the server signaling a phone switch that supports facsimile transmissions.

* * * * *